(No Model.)

G. TRUBEL.
MILK STRAINER.

No. 394,798. Patented Dec. 18, 1888.

Witnesses:
J. P. Theo. Lang.
E. J. Fenwick

Inventor:
George Trubel
by his Att'y
Mauro, Fenwick & Lawrence

UNITED STATES PATENT OFFICE.

GEORGE TRUBEL, OF LEWISTOWN, ILLINOIS.

MILK-STRAINER.

SPECIFICATION forming part of Letters Patent No. 394,798, dated December 18, 1888.

Application filed March 5, 1888. Serial No. 266,237. (No model.)

*To all whom it may concern:*

Be it known that I, GEORGE TRUBEL, a citizen of the United States, residing at Lewistown, in the county of Fulton and State of Illinois, have invented certain new and useful Improvements in Milk-Strainers; and I do hereby declare the following to be a full, clear, and exact description of the invention, such as will enable others skilled in the art to which it appertains to make and use the same.

The object of my invention is to so construct a milk-strainer that it may be readily attached to and detached from a milk pail or bucket; and it consists in certain constructions and combinations of parts, as will be hereinafter described and specifically claimed.

Figure 1:
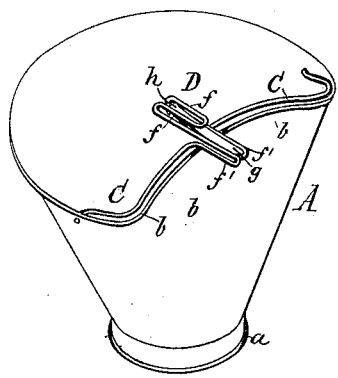
Figure 2:
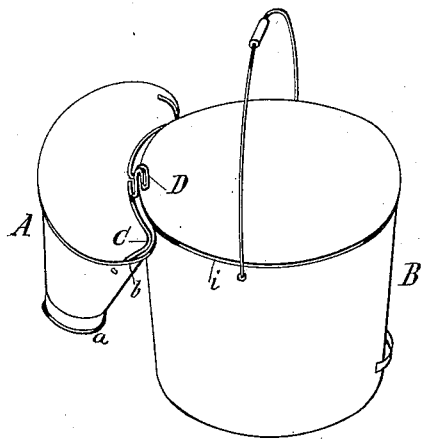
Figure 3:
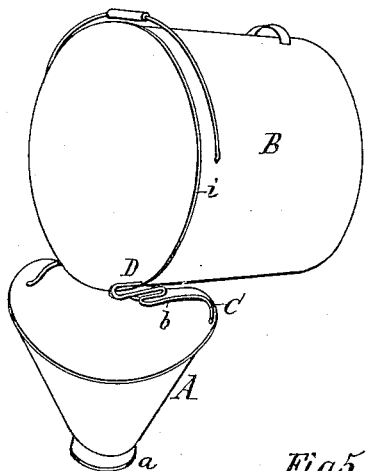
Figure 4:
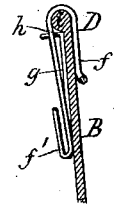
Figure 5:
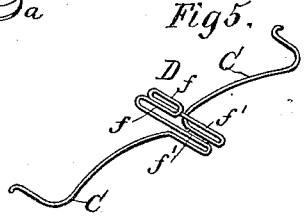

Figure 1 is an enlarged perspective view of my improved strainer. Fig. 2 is a perspective view showing the strainer applied to a milk-pail preparatory to emptying the pail of its contents. Fig. 3 is a perspective view showing the milk-strainer attached to a pail or bucket from which the milk is being poured into the strainer. Fig. 4 is a central longitudinal detail view of the strainer-clasp shown in Fig. 1 and sprung upon a pail, which is indicated by section-lines. Fig. 5 is a detail perspective view of the bail and hook or clasp of the strainer before applying the spring-detent thereto shown in Figs. 1 and 4.

In Fig. 1, A indicates my improved milk-strainer, having its front portion, as $b$, constructed in concave form, as shown, in order to fit the circular outline of the front of a milk pail or bucket, B, when, previous to pouring, the two are in juxtaposition, as indicated in Fig. 2. The strainer is provided with a pivotally-attached lifting wire bail, C, which, midway of its length, is made into the form of a hook or clasp, as D, which, when the strainer is in use, will hook over the wired edge $i$ of the pail or bucket, as represented in Figs. 2, 3, and 4. This hook, being central of the length of the bail and the point of the attachment of the strainer to the pail or bucket, preserves the strainer in a balanced or level position, as shown in Figs. 2 and 3, so as not to spill the milk from the side of the strainer during the act of straining the same. Between the front portion, $f$, and the shanks $f'$ of the hook D a detent-spring, as $g$, is interposed, as shown in Figs. 1 and 4, the same at its rear end being fixedly attached to the shanks $f'$ of the hook in such manner that the normal position and thrust of the angular shoulder $h$ of said spring $g$ shall be that occupied, as clearly indicated in Fig. 4, so that when the hook or clasp D is sprung upon a pail, as in Figs. 2, 3, and 4, the wired edge $i$ of the pail or bucket will engage with the angular shoulder $h$ of the spring $g$, and thus retain the strainer upon the pail or bucket B while in use.

The hook D, (clearly shown in Fig. 5,) which is homogeneous with the wire composing the bail proper, is of such length as to allow the strainer A to be suspended a proper distance below the wired edge or rim $i$ of the pail or bucket, as shown in Fig. 2, so that when the pail is filled with milk and tipped forward, with the front of the pail fitting against or in the concave portion $b$ of the strainer, the strainer will catch the full width of the stream of milk poured from the pail or bucket B.

It will be seen that the hook or clasp D is self-adjusting upon the pail or bucket when the wired edge $i$ of the pail is thrust therein, as shown in Figs. 2, 4, and 5, and that the adjustment of the strainer to the pail or bucket is such that when the milk is poured into the strainer it will strike with equal force and volume the entire bottom of the strainer, thus allowing the work to be quickly accomplished.

The strainer A is at bottom made with a rim, $a$, over which the strainer-cloth, whether of reticulated wire or other fabric, may be adjusted and held in place by a flexible band, and it may be readily removed when it requires to be cleaned.

What I claim is—

1. In combination with a milk-strainer, the pivoted bail C, provided with a hook or clasp portion, D, having a spring, $g$, substantially as described.

2. In combination with the strainer A, the bail C, having hook D, composed of front portion, $f$, and shanks $f'$, substantially as described.

In testimony whereof I hereunto affix my signature in presence of two witnesses.

GEORGE TRUBEL.

Witnesses:
ISAIAH C. WORLEY,
E. C. SIMENS.